(12) United States Patent
Aull

(10) Patent No.: US 6,934,393 B2
(45) Date of Patent: Aug. 23, 2005

(54) SYSTEM AND METHOD FOR THIRD PARTY RECOVERY OF ENCRYPTION CERTIFICATES IN A PUBLIC KEY INFRASTRUCTURE

(75) Inventor: Kenneth W. Aull, Fairfax, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 870 days.

(21) Appl. No.: 09/815,770

(22) Filed: Mar. 23, 2001

(65) Prior Publication Data
US 2002/0138724 A1 Sep. 26, 2002

Related U.S. Application Data

(60) Provisional application No. 60/210,465, filed on Jun. 9, 2000, and provisional application No. 60/229,336, filed on Sep. 1, 2000.

(51) Int. Cl.[7] ............................................. G06F 17/00
(52) U.S. Cl. ..................................... 380/286; 380/277
(58) Field of Search ................................ 380/277–286, 380/44–47; 713/155–159, 168–172

(56) References Cited

U.S. PATENT DOCUMENTS 6,185,308 B1  2/2001  Ando et al.
6,810,122 B1 *  10/2004  Miyazaki et al. ........... 380/277
6,823,070 B1 *  11/2004  Smith et al. ................ 380/286
6,829,356 B1 *  12/2004  Ford .......................... 380/277

FOREIGN PATENT DOCUMENTS

JP  11-85015  3/1999

OTHER PUBLICATIONS http://csrc.nist.gov/keyrecovery/.*

* cited by examiner

Primary Examiner—David Jung
(74) Attorney, Agent, or Firm—Tarolli, Sundheim, Covell & Tummino L.L.P.

(57) ABSTRACT

A first enterprise official desires to recover an encryption certificate of a user. The user may be a current member of an enterprise or a former member of the enterprise. The first enterprise official convinces a second enterprise official to designate the encryption certificate of the user as approved for recovery, where the second enterprise official has authorization to designate the encryption certificate as approved for recovery. The encryption certificate is designated as approved for recovery. The first enterprise official convinces a third enterprise official to execute recovery of the encryption certificate. The third enterprise official has authorization to execute recovery of the encryption certificate. The encryption certificate is recovered by the third enterprise official and provided to the first enterprise official.

20 Claims, 4 Drawing Sheets

SYSTEM AND METHOD FOR THIRD PARTY RECOVERY OF ENCRYPTION CERTIFICATES IN A PUBLIC KEY INFRASTRUCTURE

CROSS REFERENCE TO RELATED APPLICATIONS

This application claims the benefit of U.S. Provisional Application No. 60/210,465 filed on Jun. 9, 2000, and U.S. Provisional Application No. 60/229,336 filed on Sep. 1, 2000, the contents of which are expressly incorporated by reference herein.

BACKGROUND

1. Field of the Invention

This invention relates to Public Key Infrastructures (PKI), and more specifically to recovery of encryption certificates in a PKI.

2. Background Information

A public key infrastructure (PKI) is a collection of servers and software that enables an organization, company, or enterprise to distribute and manage thousands of unique public/private cryptographic keys in a manner that allows users to reliably determine the identity of the owner of each public/private key pair. When each member of an enterprise has a unique key, paper-based business processes may be transitioned to an online, electronic equivalent. Public/private key pairs have the property that for any given public key there exists one and only one private key, and vice versa. Public key cryptography (i.e., the ability to publicly distribute the encryption key) can be used to digitally sign documents. If a particular message can be decrypted using one member of the key pair, then the assumption is that the message must have been encrypted using the other member. If only one person knows the key used to perform the encryption of a document in the first place, then the recipients that can decrypt the document can be sure that the sender of the document must be that person.

However, for a digital signature to be meaningful, the recipient of an object signed with the digital signature must first be able to reliably determine the owner and integrity of the key used to sign the object. Public infrastructures accomplish this using an electronic document called a digital certificate. Certificates may contain information identifying the owner of the key pair, the public component of the pair, and the period of time for which the certificate is valid. The certificate may also identify technical information about the key itself, such as the algorithm used to generate the key, and the key length. Certificates are generated by organizations, companies, or enterprises that are responsible for verifying the identity of individuals (or in some instances organizations) to which certificates are issued. The certifying organization is known as a certificate authority. The certificate authority signs each certificate using a private key known only to the certificate authority itself. This allows users of the PKI to verify both the integrity of the certificate and the identity of the authority that issued it. By issuing a certificate, a certificate authority is stating that it has verified that the public key that appears in the certificate (and, by extension, the corresponding private key) belongs to the individual listed in the certificate. The integrity with which the registration process operates is, therefore, of great importance. The process must provide mechanisms for reliably identifying the individual and for verifying that the public key listed in the certificate belongs to that individual.

FIG. 1 shows a block diagram of an example PKI system architecture. Current PKIs that provide strong authentication of user identity accomplish this via the use of a local registration authority officer (LRAO) 12. LRAO 12 operates at a work station or server platform 14 that runs a local registration authority software application 16. Server platform 14 may be any known computing device that may serve as a server, e.g., computer, workstation, etc. The local registration authority application 16 interfaces to other server platforms that may contain applications such as a certificate authority application 18, a registration authority application 20, and/or a key recovery authority application 22. Each application may be on the same server platform, or on separate individual server platforms 14. A user 10, that is using or desires access to the PKI system architecture, accesses the system via a web browser 22 on a client platform 24. A hardware token 26, such as a smart card, may also be operably connectable to client platform 24. Typically in current systems, user 10 presents a photo I.D. to the local registration authority officer 12 in order to authenticate the user's identity. Local registration authority officer 12 then uses workstation 14 and local registration authority application 16 to signal a registration authority application 20 to register new user 10 in the system. Local registration authority application 16 may be off-the-shelf product software that comes typically bundled with a certificate authority application 18, registration authority application 20, and key recovery authority 22 software.

A public/private key pair is generated by either the local registration authority application 16 or the registration authority application 20 (depending on products chosen and depending on how they've been configured). The public key is sent to certificate authority application 18 to be signed, thereby, generating a certificate for new user 10. A backup copy of the private key may also be sent to key recovery authority application 22, however, normally the private key is kept on a token 26, or at client platform 24 by user 10. Once the public key is sent to a certificate authority 18 and signed, a user certificate is generated and provided to a local registration authority server. Local registration authority officer 12 copies the certificate (including the private key) onto a floppy disk, hardware token, or other storage medium, and then provides the certificate and private key to the user.

A person in the enterprise may wish to access a document that has been encrypted via a user's encryption certificate (either the user's current certificate or one of the user's previous certificates). The user might be unable to, or unwilling to, decrypt the document personally. Or, the user may have left the enterprise, therefore, being unavailable to decrypt the document. The document that has been encrypted with the user's encryption certificate may be a current document, or may be an historical document that was written or archived by that user. In any event, a third party who wishes to decrypt one or more documents of a user, must recover the encrypted certificate used by the user in order to decrypt the document(s).

Current PKI systems make no distinction between current users and former users of an enterprise in terms of certificate recovery. Depending on the PKI being used, the person desiring recovery of the user certificate, e.g., an enterprise officer, presents a photo I.D. to either a local registration authority officer (LRAO) or a key recovery officer (KRO) of the enterprise in order to authenticate the identity of the enterprise officer. Either the local registration authority officer or the key recovery officer uses server software to signal a key recovery authority to recover a copy of the old encryption certificate belonging to the user. The user's encryption certificate is then provided to the local registration authority or the key recovery officer (depending on the PKI being used). The local registration authority officer (or the key recovery officer) copies the certificate on to a floppy disk, hardware token, or other storage medium and hands the certificate to the requesting enterprise officer. Therefore, recovery of a user's encryption certificate may be obtained by contacting one enterprise officer, either the local registration authority officer or a key recovery officer.

However, in order to protect the confidentiality of encrypted documents, an enterprise may not want to make the recovery of encryption certificates too easy. For example, an enterprise may choose to enforce a policy that a certificate may be recovered only upon the agreement of two trusted officers. The two trusted officers are chosen such that it is unlikely that the two officers will enter into collusion to defraud or otherwise harm the enterprise or the user. However, maintaining a cadre of such officers may be expensive in terms of labor costs.

Moreover, current recovery of encryption certificates using local recovery approval are problematic in that they: are time consuming due to having to contact a local recovery approval (e.g., LRAO or KRO); untimely because key recovery is subject to the work load and availability of the local recovery approval; costly because of the need for multiple local recovery approvals in a large enterprise; inefficient in locating and providing a user's encryption certificate to a requester; and less secure because local recovery approvals have minimum checks and balances to avoid unauthorized recovery of user encryption certificates.

Therefore, a need exists for third party recovery of encryption certificates of a user, whereby the cost of certificate recovery is reduced without compromising the confidentiality of encrypted documents.

SUMMARY

The present invention is directed to a method for third party recovery of encryption certificates in a Public Key Infrastructure (PKI) that includes: convincing a second enterprise official to designate an encryption certificate of a user as approved for recovery, where the convincing is performed by a first enterprise official because the first enterprise official desires to recover the encryption certificate, and the second enterprise official has authorization to designate the encryption certificate as approved for recovery; designating the encryption certificate as approved for recovery; convincing a third enterprise official to execute recovery of the encryption certificate, where the convincing is performed by the first enterprise official, and the third enterprise official has authorization to execute recovery of the encryption certificate; recovering the encryption certificate by the third enterprise official; and providing the encryption certificate to the first enterprise official by the third enterprise official. The first enterprise official, the second enterprise official, and the third enterprise official are members of an enterprise.

The present invention is also directed to an article comprising a storage medium having instructions stored therein, where the instructions when executed cause a processing device to perform: receiving a signature certificate of a first enterprise official to authenticate the first enterprise official to the processing device; receiving a request from the first enterprise official that an encryption certificate of a user be designated as recoverable; querying a directory to verify that the first enterprise official is allowed to approve recovery of the encryption certificate of the user; signaling a key recovery authority to tag the encryption certificate of the user as recoverable; receiving a signature certificate of a second enterprise official to authenticate the second enterprise official to the processing device; receiving a request from the second enterprise official that the encryption certificate be recovered; querying the directory to verify that the second enterprise official is allowed to recover the encryption certificate of the user; and signaling a key recovery authority to send the encryption certificate of the user to the second enterprise official.

The present invention is further directed to a system for third party recovery of encryption certificates in a Public Key Infrastructure (PKI). The system includes a directory is operably connected to a network, where the directory contains information on one or more users. The directory also contains an enterprise official associated with each user that is authorized to designate an encryption certificate of the associated user as recoverable. The system also includes one or more servers operably connected to the network. The one or more servers receive and process requests for designating the encryption certificate of a user as recoverable. The one or more servers also receive and process requests for recovering the encryption certificate of a user. The one or more servers send the encryption certificate to an enterprise official after receiving authorization to send the encryption certificate to the enterprise official.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
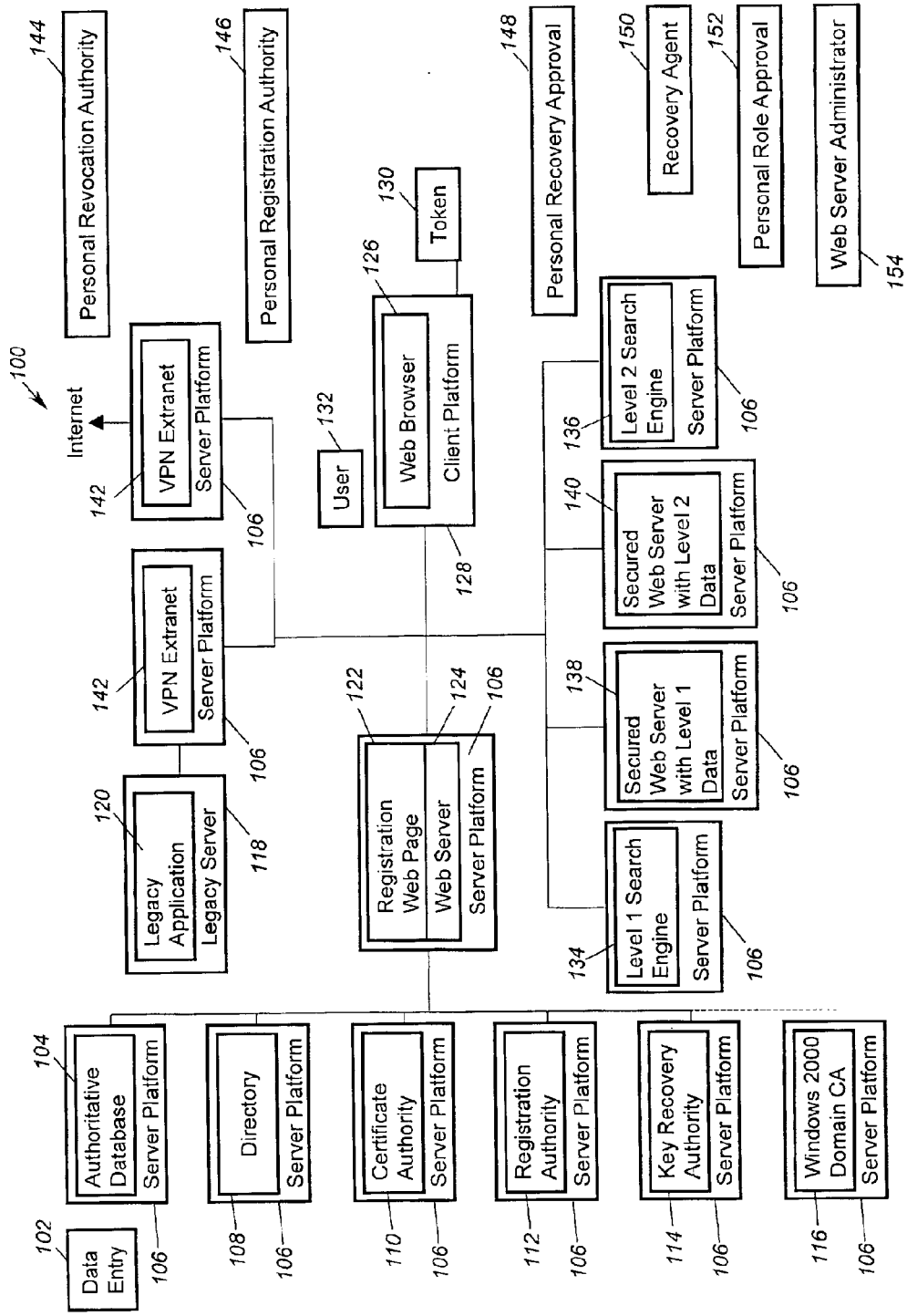
FIG. 2 is a block diagram of an exemplary system architecture in which PKI processes may be practiced according to an example embodiment of the present invention.

FIG. 2 shows a block diagram of an exemplary system architecture 100 in which Public Key Infrastructure (PKI) processes may be practiced according to an example embodiment of the present invention. The present invention is not limited to the system architecture 100 shown in FIG. 2. The boxes shown in FIG. 2 represent entities that may be hardware, software, or a combination of the two. The entities are operably connected together on a network. Entities not shown as being connected to the network represent one or more human beings that perform the function denoted inside the box.

System architecture 100 includes Data Entry 102 which performs a data entry function for Authoritative Database 104. Authoritative Database 104 is resident on server platform 106. A server platform 106 is referred to in this description but it should be understood that the present invention is not limited to any particular server architecture. Server platform 106 may be, for example, UNIX or Windows NT servers.

Authoritative database 104 contains information about members of the group or enterprise (e.g., company) for which PKI services in accordance with the present invention may be performed. The present invention is not limited by the structure of the group or enterprise for which information is stored in the authoritative database 104. The information contained in Authoritative database 104 may include, for example, the name, address, telephone numbers, manager's name, employee identification, etc., of the members of the group or enterprise. Directory 108 contains the same information contained in database 104, but is optimized for fast look-up of the information stored therein rather than fast data entry. The information contained in Directory 108 may be accessed faster than accessing the information from database 104. Directory 108 functions similar to an on-line quickly accessible phone book, containing reference information about the members of the group or enterprise stored in authoritative database 104.

Certificate authority 110 may be conventional off-the shelf software executed on server platform 106. Certificate authority 110 provides storage of certificates and related information. This will be described in more detail hereinafter. Registration authority 112 may also be off-the shelf software executable on server platform 106. Registration authority 112 will also be described in more detail hereinafter. Key recovery authority 114 may also be off-the shelf server software executable on Server Platform 106, and may provide the function of recovering keys (e.g., archived or lost keys) for members of the group or enterprise.

A Windows 2000 Domain Certificate Authority (CA) 116 is shown with a dotted line connection to the network and may or may not be part of a system according to the present invention. Windows 2000 is able to use PKI certificates for network single sign-on, but Windows 2000 is designed to use only the Windows Certificate Authority Windows. Therefore, a system according to the present invention may include a conventional Certificate Authority 110 as well as a 2000 Domain CA 116.

Legacy server 118 executes legacy application programs 120. Legacy server 118 may be, without limitation, a main frame, mini-computer, workstation or other server capable of hosting legacy software applications. Legacy software applications generally may not be designed to be inherently interoperable with a PKI. Legacy applications 120 may be accessible on the client side by a custom client 128 such as an emulator or custom database Graphic User Interface (GUI). Examples of emulators are terminal emulators of an IBM 3270 or terminal emulators of a vt100.

Figure 1:
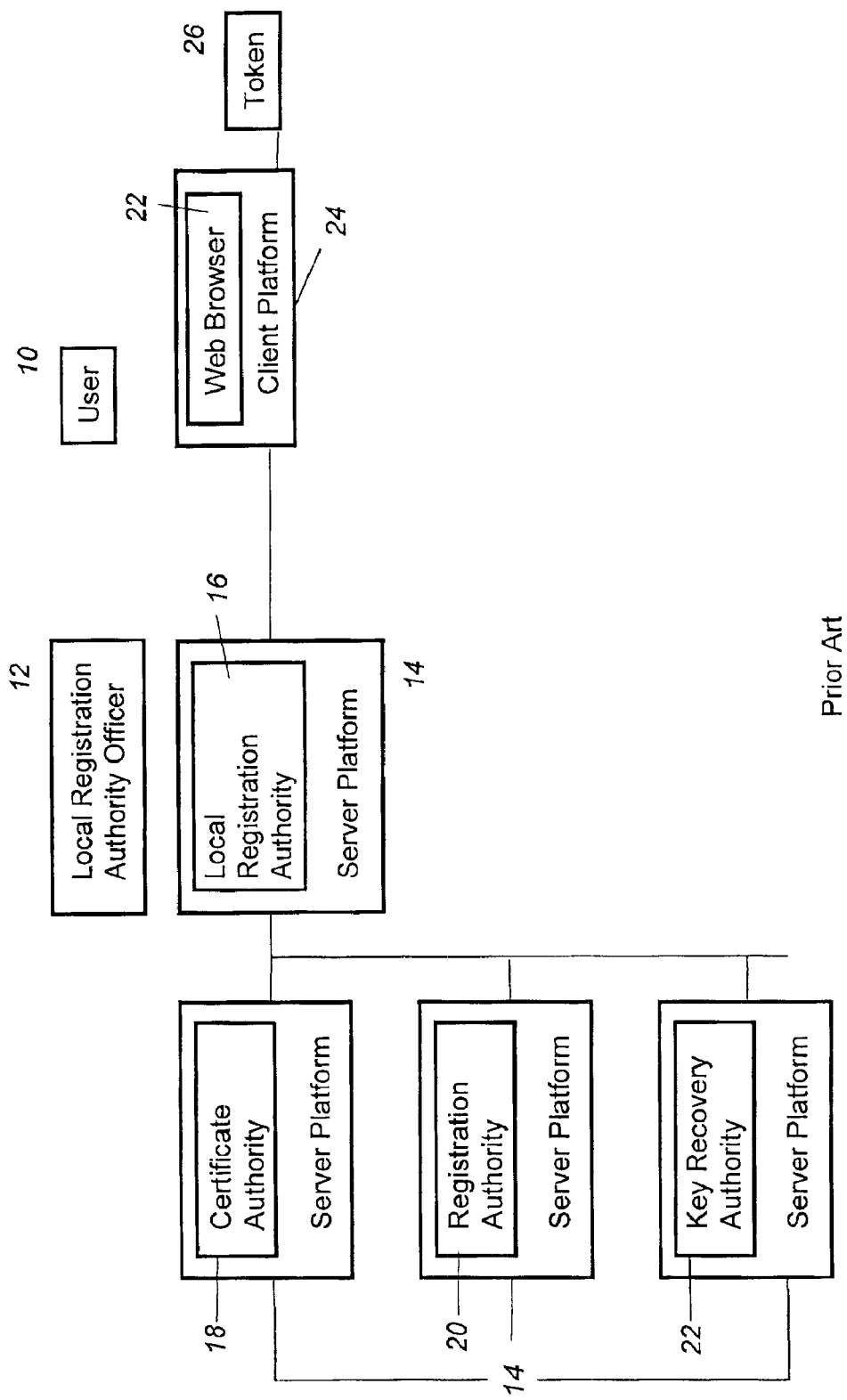
FIG. 1 is a block diagram of an example PKI system architecture.

Registration web page 122, which may be one or more pages, functions as the user interface to system architecture 100 shown in FIG. 1. Web Server 124 is a software application that serves Web Pages (such as web page 122) or other HTML outputs to a web browser client (such as web browser 126). Web Server 124 may be any software application that serves Web Pages or HTML outputs such as, for example, Apache, Microsoft Internet Information Server application, etc.

Web browser 126 is resident on client platform 128 which may be any user computer or computing device. Web browser 126 may be a client software application for browsing web pages such as, for example, HTML protocols, XML protocols, or other protocols. Web browser 126 may be programmed to operate with PKI certificates issued by certificate authority 110. Examples of web browsers which have this capability include Netscape Navigator and Microsoft Internet Explorer. The token 130 may be a smart card, a device with a Universal Serial Bus (USB), or other hardware token device capable of generating, storing, and/or using PKI certificates.

A user 132 is a person that uses or desires access to system architecture 100. User 132 may transition through a number of states which include, for example, a new user, a current user, and a former user. A former user is no longer a member of the group or enterprise. System architecture 100 is described with reference to two levels of security with each level corresponding to a different security requirement. The number of the levels of security is not a limitation of the present invention. The level 1 search engine 134 may be a search engine that is permitted to search system architecture 100, but is allowed access to only level 1 data which is the lowest level of security. Level 1 data may be, for example, data which is freely distributable whereas level 2 data may be considered to be proprietary. A Level 2 search engine 136 may be a search engine which is allowed to search both level 1 and level 2 data. A Level N search engine (not illustrated) may be a search engine which is allowed to search through servers possessing Levels 1 through N data.

A secured level server with Level 1 data may be a web server containing only level 1 data that is secured so that users may need to have level 1 access (at least) to access the level 1 servers. A secured web server with level 2 data 140 may be a web server that contains level 2 data that has been secured so that users must have at least level 2 access to access the level 2 servers. A user with level 2 access may have access to both level 1 and level 2 servers. A secured web server with level N data (not illustrated) is a web server that contains level N data which is accessible by users with level N or above. Users with level N or above access may have access to all levels of data up through level N data.

VPN Extranet 142 may be a software application which functions as a network gateway, which as illustrated, may be either to legacy server 118 and legacy application 120 or to an external network such as the Internet. Personal revocation authority 144 may be one or more people that are in charge of revocation of members from system network 100. Personal registration authority 146 may be one or more people that are in charge of registration of members in system network 100. Personal recovery approval 148 may be one or more people that are in charge of obtaining recovery of certificates. A Recovery Agent 150 may be one or more people that perform recovery of certificates and may only recover a certificate if the certificate has first been designated as recoverable by another person. Personal role approval 152 may be one or more people that approve different role functions within the system network 100. A web server administrator may be one or more people that are in charge of various web functions in system network 100.

The present invention relates to systems and methods for third party recovery of encryption certificates which ensure that encryption certificates are recovered securely, expeditiously, and with minimum human intervention, thereby, lowering the PKI operating and maintenance costs. A determination is made as to whether a user is a current user or a former user. If the user is still a current user, the enterprise may have access to some officer, such as the user's manager, who is able to authorize recovery of the user's encryption certificate. However, in the case of a former user (i.e., users who have left the enterprise) there might not be any way to know who the user's manager was before the user left since the enterprise may have reorganized several times since then, and/or the user's manager may also have since left the enterprise.

In systems and methods for third party recovery of encryption certificates according to the present invention, to recover an encryption certificate of a user, two people are required. In the case of a current user, a personal recovery approval officer (PRA) and a recovery agent (RA) are both required to recover an encryption certificate of a user by a third party. The personal recovery approval officer may be the user's manager. The recovery agent may be a highly trusted officer of the enterprise, such as an employee from the human resources department or the legal department. Geographically dispersed sites within the enterprise may have their own recovery agent. In the case of former users, two enterprise officials, e.g., two recovery agents, may be required to recover an encryption certificate of the user by a third party. One enterprise official is authorized to designate an encryption certificate of a user as recoverable, and the second enterprise official is authorized to recover the approved for recovery encryption certificate of the user. Therefore, in systems and methods for third party recovery of an encryption certificate according to the present invention, an encryption certificate of a user may be recovered only upon the agreement of two trusted officers of the enterprise.

Figure 3:
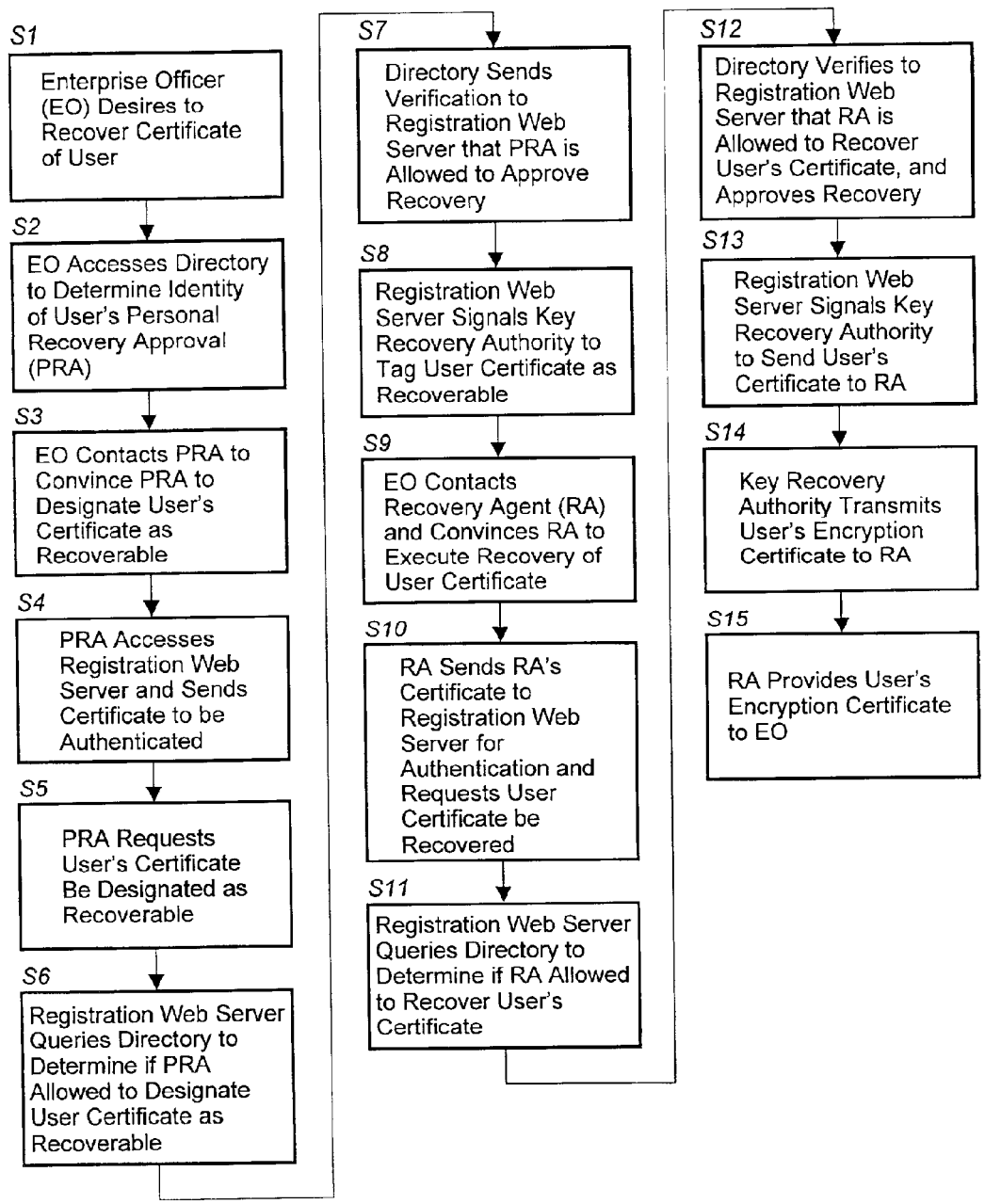
FIG. 3 is a flowchart of an example process for third party recovery of an encryption certificate of a current user in a public key infrastructure according to an example embodiment of the present invention.

FIG. 3 is a flowchart of an example process for third party recovery of an encryption certificate of a current user according to an example embodiment of the present invention. An enterprise officer (or other person in the enterprise) desires to recover a user's encryption certificate S1. The encryption certificate may be the current certificate of the user, or one of the user's previous encryption certificates. The enterprise officer (EO) accesses a directory of the enterprise to determine the identity of the user's personal recovery approval (PRA). The enterprise officer accesses the directory either directly or via a web page. The personal recovery approval may be the user's manager or supervisor. The personal recovery approval is a person who has the authority to designate the particular user's encryption certificate as approved for recovery. The directory may be a database or other storage facility, and contains all users that are members of the enterprise and an associated personal recovery approval person for each user. Therefore, each user has an associated personal recovery approval that is authorized to designate the user's encryption certificate as recoverable.

After determining the identity of the user's personal recovery approval from the directory, the enterprise officer contacts the personal recovery approval to convince the personal recovery approval to designate the user's encryption certificate as recoverable S3. The PRA may need to be convinced of who the third party enterprise officer is, why the user cannot use his/her certificate for the purposes of the enterprise officer, and/or why the enterprise officer needs access to the encryption certificate of the user. The personal recovery approval accesses a registration web server and sends his/her signature certificate to the registration web server to be authenticated S4. The registration web server receives the signature certificate of the personal recovery approval and verifies the identity of the personal recovery approval. The personal recovery approval requests that the user's encryption certificate be designated as recoverable S5. Although the personal recovery approval has been authenticated by the registration web server as indeed being the personal recovery approval, the registration web server may not know if the personal recovery approval is authorized to designate an encryption certificate of the user as approved for recovery or recoverable.

Therefore, the registration web server queries the directory to determine if the personal recovery approval is indeed allowed to designate the user's encryption certificate as recoverable S6. The directory contains information about all users that are members of the enterprise, as well as enterprise officials associated with each user that have been authorized for particular functions regarding encryption certificates of each user. The personal recovery approval may specify a user's I.D. directly by typing it into the web page and having the web page query the directory, or the PRA may simply request a list of all user's for whom the PRA is authorized to approve recovery, and the PRA can select the user's I.D. from this list presented via the web page by the directory.

The directory sends verification to the registration web server that the PRA is indeed allowed to approve recovery of the user's encryption certificate S7. The registration web server signals a key recovery authority to tag the user's encryption certificate as approved for recovery S8. The key recovery authority may be an application that resides on a server of the enterprise where the server stores encryption certificates of users that are members of the enterprise. If the user's certificate is not tagged as approved for recovery, the certificate may not be recovered.

The enterprise officer that desires recovery of the encryption certificate of the user, contacts a recovery agent (RA) and convinces the recovery agent to execute recovery of the user's encryption certificate S9. The recovery agent, if convinced, sends his/her signature certificate to the registration web server for authentication, and then requests that the user's encryption certificate be recovered S10. The registration web server uses the recovery agent's encryption certificate to verify (i.e., authenticate) the recovery agent.

The registration web server queries the directory to determine if the recovery agent is authorized or allowed to recover the user's encryption certificate S11. If the recovery agent is allowed to recover the user's certificate, the directory verifies to the registration web server that the recovery agent is allowed to recover the user's certificate, and approves recovery of the user's encryption certificate S12. The registration web server signals the key recovery authority to send the user's certificate to the recovery agent S13. The key recovery authority transmits the user's encryption certificate to the recovery agent S14. The recovery agent then provides the user's encryption certificate to the requesting enterprise officer S15. The requesting enterprise officer may now use the user's encryption certificate to decrypt documents previously encrypted by the user.

Figure 4:
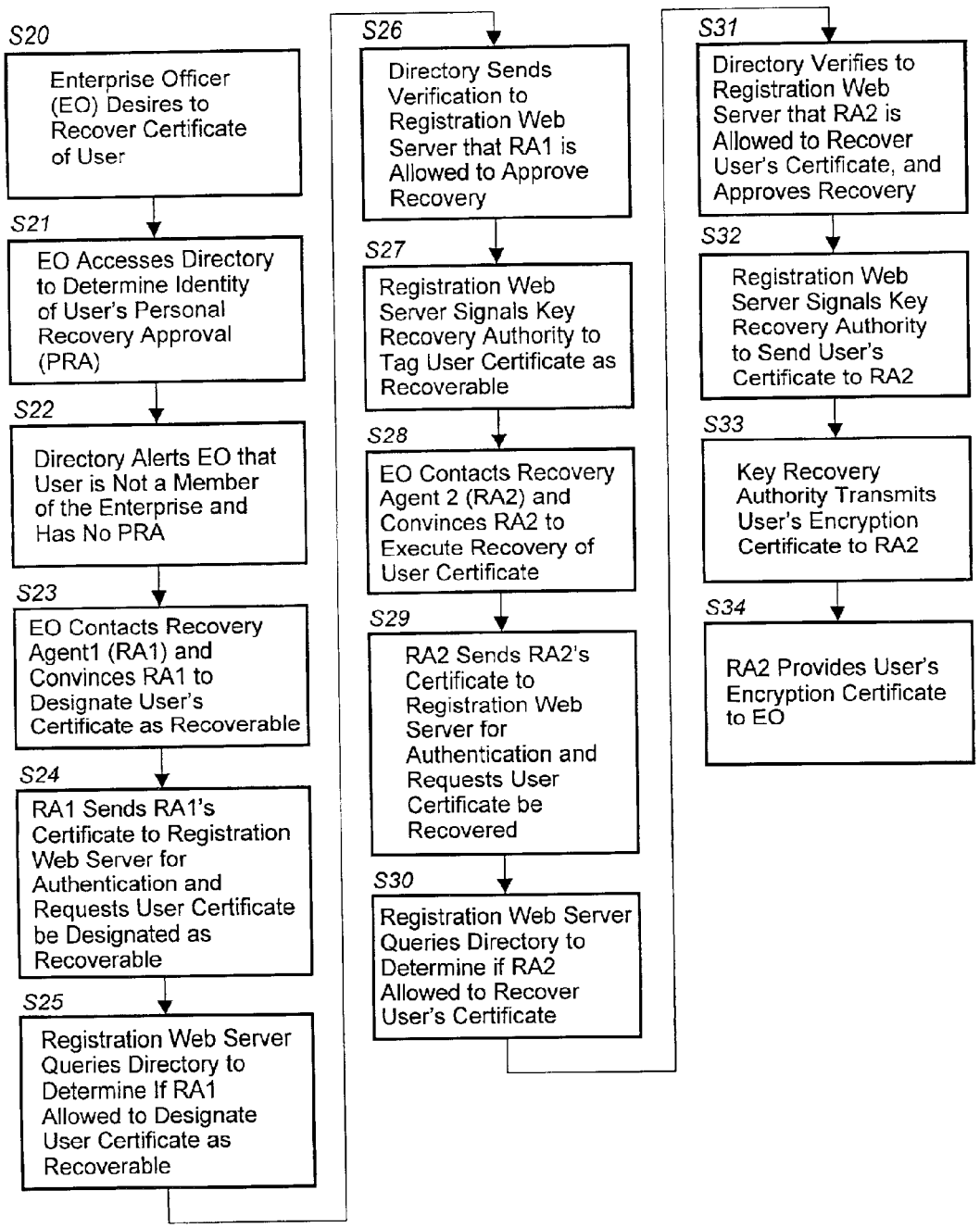
FIG. 4 is a flowchart of an example process for third party recovery of encryption certificate of a former user in a public key infrastructure according to an example embodiment of the present invention.

FIG. 4 is a flowchart of an example process for third party recovery of encryption certificates of a former user according to an example embodiment of the present invention. An enterprise officer (or someone else) desires to recover an encryption certificate of a user S20. The enterprise officer accesses a directory to determine the identity of the user's personal recovery approval (PRA) S21. The directory alerts the enterprise officer that the user is not a member of the enterprise and not in the directory and, therefore, has no personal recovery approval S22. The enterprise officer contacts a first recovery agent (RA1) and convinces RA1 to designate the user's encryption certificate as recoverable S23. Recovery agent RA1 sends his/her signature certificate to the registration web server for authentication, and requests that the user's encryption certificate be designated as recoverable S24.

The registration web server queries the directory to determine if the recovery agent (RA1) is allowed to designate the user's encryption certificate as approved for recovery S25. The directory verifies that the first recovery agent is indeed authorized to make this designation, and sends verification to the registration web server that recovery agent RA1 is allowed to approve recovery of the user's encryption certificate S26. The registration web server signals the key recovery authority to tag the user's certificate as approved for recovery S27. If the user's certificate is not tagged as approved for recovery, the certificate may not be recovered.

The enterprise officer contacts a second recovery agent (RA2) and convinces RA2 to execute the recovery of the user's certificate S28. The second recovery agent sends his/her signature certificate to the registration web server for authentication, and then requests that the user's encryption certificate be recovered S29. The registration web server queries the directory to determine if the second recovery agent is allowed to recover the user's certificate S30. The directory verifies to the registration web server that the second recovery agent is allowed to recover the user's certificate, if this is indeed the case, and then approves recovery S31. The registration web server signals the key recovery authority to send the user's encryption certificate to the second recovery agent S32. The key recovery authority transmits the user's encryption certificate to the second recovery agent S33. The second recovery agent then provides the user's encryption certificate to the requesting enterprise officer S34.

Systems and methods for third party recovery of encryption certificates according to the present invention are advantageous in that they are more secure than dedicated local recovery approval personnel, have lower cost, and provide for more timely recovery of encryption certificates. Further, the present invention provides a more cost effective solution over multiple local recovery approvals, and provides clearly defined recovery scenarios, with strong checks and balances.

Costs are saved in that the present invention reduces paper work by incorporating an electronic process, shortens business process time lines since minimal amount of human intervention is required, and promotes remote collaboration amongst the members of the enterprise. Security is improved since in systems and methods for third party recovery of encryption certificates according to the present invention, all parties involved in recovery of a user' encryption certificate are authenticated. The advantages of the present invention are accomplished since manual processes that current PKI systems use have been replaced with automated processes that accomplish many of the same tasks.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for third party recovery of encryption certificates in a Public Key Infrastructure (PKI) comprising:
    convincing a second enterprise official to designate an encryption certificate of a user as approved for recovery, the convincing performed by a first enterprise official, the first enterprise official desiring to recover the encryption certificate, the second enterprise official having authorization to designate the encryption certificate as approved for recovery;
    designating the encryption certificate as approved for recovery;
    convincing a third enterprise official to execute recovery of the encryption certificate, the convincing performed by the first enterprise official, the third enterprise official having authorization to execute recovery of the encryption certificate;
    recovering the encryption certificate by the third enterprise official; and
    providing the encryption certificate to the first enterprise official by the third enterprise official, wherein the first enterprise official, the second enterprise official, and the third enterprise official are members of an enterprise.

2. The method according to claim 1, wherein the user is a current member of the enterprise.

3. The method according to claim 2, wherein the second enterprise official comprises a personal recovery approval associated with the user, the association listed in a directory of the enterprise.

4. The method according to claim 3, further comprising accessing the directory by the first enterprise official to determine the personal recovery approval associated with the user, the accessing occurring before the convincing the second enterprise official to designate the encryption certificate of the user as approved for recovery.

5. The method according to claim 4, wherein the designating the encryption certificate as approved for recovery comprises:

accessing a registration web server by the personal recovery approval;

sending a signature certificate of the personal recovery approval to the registration web server by the personal recovery approval to authenticate the personal recovery approval to the registration web server;

requesting, by the personal recovery approval, that the encryption certificate be designated as recoverable;

querying the directory by the registration web server to verify that the personal recovery approval is allowed to approve recovery of the encryption certificate of the user; and signaling a key recovery authority by the registration web server to tag the encryption certificate of the user as recoverable.

6. The method according to claim 4, wherein the recovering the encryption certificate by the third enterprise official comprises:

accessing a registration web server by the third enterprise official;

sending a signature certificate of the third enterprise official to the registration web server by the third enterprise official to authenticate the third enterprise official to the registration web server;

requesting, by the third enterprise official, that the encryption certificate be recovered;

querying the directory by the registration web server to verify that the third enterprise official is allowed to recover the encryption certificate of the user; and signaling a key recovery authority by the registration web server to send the encryption certificate of the user to the third enterprise official.

7. The method according to claim 1, wherein the user is a former member of the enterprise.

8. The method according to claim 7, further comprising accessing a directory of the enterprise by the first enterprise official to determine a personal recovery approval associated with the user in the directory, the accessing occurring before the convincing the second enterprise official to designate the encryption certificate of the user as approved for recovery.

9. The method according to claim 8, further comprising notifying the first enterprise official by the directory that the user is not a member of the enterprise and has no associated personal recovery approval.

10. The method according to claim 7, wherein the designating the encryption certificate as approved for recovery comprises:

accessing a registration web server by the second enterprise official;

sending a signature certificate of the second enterprise official to the registration web server by the second enterprise official to authenticate the second enterprise official to the registration web server;

requesting, by the second enterprise official, that the encryption certificate be designated as recoverable;

querying the directory by the registration web serving to verify that the second enterprise official is allowed to approve recovery of the encryption certificate of the user; and signaling a key recovery authority by the registration web server to tag the encryption certificate of the user as recoverable.

11. The method according to claim 7, wherein the recovering the encryption certificate by the third enterprise official comprises:

accessing a registration web server by the third enterprise official;

sending a signature certificate of the third enterprise official to the registration web server by the third enterprise official to authenticate the third enterprise official to the registration web server;

requesting, by the third enterprise official, that the encryption certificate be recovered;

querying the directory by the registration web server to verify that the third enterprise official is allowed to recover the encryption certificate of the user; and signaling a key recovery authority by the registration web server to send the encryption certificate of the user to the third enterprise official.

12. An article comprising a storage medium having instructions stored therein, the instructions when executed causing a processing device to perform:

receiving a signature certificate of a first enterprise official to authenticate the first enterprise official to the processing device;

receiving a request from the first enterprise official that an encryption certificate of a user be designated as recoverable;

querying a directory to verify that the first enterprise official is allowed to approve recovery of the encryption certificate of the user;

signaling a key recovery authority to tag the encryption certificate of the user as recoverable;

receiving a signature certificate of a second enterprise official to authenticate the second enterprise official to the processing device;

receiving a request from the second enterprise official that the encryption certificate be recovered;

querying the directory to verify that the second enterprise official is allowed to recover the encryption certificate of the user; and signaling a key recovery authority to send the encryption certificate of the user to the second enterprise official.

13. The article according to claim 12, wherein the user is a current member of an enterprise that includes at least the processing device, the directory, the key recovery authority, the first enterprise official and the second enterprise official.

14. The article according to claim 12, wherein the user is a former member of an enterprise that includes at least the processing device, the directory, the key recovery authority, the first enterprise official and the second enterprise official.

15. The article according to claim 12, wherein the key recovery authority is an application on a server.

16. A system for third party recovery of encryption certificates in a Public Key Infrastructure (PKI) comprising:

a directory operably connected to a network, the directory containing information on at least one user, the directory further containing a respective first enterprise official associated with each at least one user that is authorized to designate an encryption certificate of the at least one user as recoverable; and a server operably connected to the network, the server receiving and processing requests for designating the encryption certificates of the at least one user as recoverable and requests for recovering the encryption certificates of the at least one user, the server sending the encryption certificate to a second enterprise official after receiving authorization to send the encryption certificate to the second enterprise official.

17. The system according to claim 16, wherein the directory comprises a database.

18. The system according to claim 16, further comprising a registration web page application resident on the server, the registration web page application receiving and processing the requests for designating the encryption certificate as recoverable and the requests for recovering the encryption certificate.

19. The system according to claim 16, further comprising a key recovery authority application resident on a second server, the key recovery authority sending the encryption certificate to the second enterprise official after receiving the authorization from the server to send the encryption certificate to the second enterprise official.

20. The system according to claim 16, wherein the server performs the receiving and processing of requests for designating the encryption certificates of the at least one user as recoverable and requests for recovering the encryption certificates of the at least one user, and the sending the encryption certificate to the second enterprise official after receiving authorization to send the encryption certificate to the second enterprise official.

* * * * *